(12) United States Patent
Cha

(10) Patent No.: US 10,908,656 B2
(45) Date of Patent: Feb. 2, 2021

(54) COMPUTING DEVICES

(71) Applicant: Hewlett-Packard Development Company, L.P., Houston, TX (US)

(72) Inventor: Dong Ryul Cha, Houston, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/089,726

(22) PCT Filed: Jun. 13, 2016

(86) PCT No.: PCT/US2016/037241
§ 371 (c)(1),
(2) Date: Sep. 28, 2018

(87) PCT Pub. No.: WO2017/217969
PCT Pub. Date: Dec. 21, 2017

(65) Prior Publication Data
US 2019/0086973 A1    Mar. 21, 2019

(51) Int. Cl.
*G06F 1/18* (2006.01)
(52) U.S. Cl.
CPC .............. *G06F 1/182* (2013.01); *G06F 1/181* (2013.01); *G06F 1/183* (2013.01); *G06F 2200/1635* (2013.01)
(58) Field of Classification Search
CPC ...................................................... G06F 1/182
See application file for complete search history.

(56) References Cited

U.S. PATENT DOCUMENTS

| 4,672,510 | A | * | 6/1987 | Castner | H05K 5/03 |
| | | | | | 361/679.32 |
| 4,807,759 | A | * | 2/1989 | Castner | H05K 5/03 |
| | | | | | 206/1.5 |
| 5,224,018 | A | * | 6/1993 | Kobayashi | G06F 1/1616 |
| | | | | | 361/679.37 |
| 5,491,611 | A | * | 2/1996 | Stewart | G06F 1/181 |
| | | | | | 312/223.2 |
| 5,732,000 | A | * | 3/1998 | Chiesi | G06F 1/181 |
| | | | | | 361/679.57 |
| 5,764,477 | A | * | 6/1998 | Ohgami | G06F 1/1616 |
| | | | | | 292/163 |
| 6,053,586 | A | * | 4/2000 | Cook | E05B 65/006 |
| | | | | | 292/146 |
| 6,071,143 | A | * | 6/2000 | Barthel | G06F 1/184 |
| | | | | | 439/377 |
| 6,185,103 | B1 | * | 2/2001 | Yamada | G11B 33/124 |
| | | | | | 292/300 |

(Continued)

FOREIGN PATENT DOCUMENTS

JP            2014052762 A        3/2014

*Primary Examiner* — James Wu
*Assistant Examiner* — Christopher L Augustin
(74) *Attorney, Agent, or Firm* — HP Inc. Patent Department

(57) ABSTRACT

In an example, a device may comprise a panel, a slider to retain the panel to the device, an actuator engaged with the slider, and a release member engaged with the actuator. The actuator may move the slider to unlock the panel and release the panel so that the panel is removable from the device. The release member may cause the actuator to move the slider when the release member is moved to a second position from a first position.

11 Claims, 10 Drawing Sheets

(56) References Cited

U.S. PATENT DOCUMENTS

| | | | |
|---|---|---|---|
| 6,381,138 B1 | 4/2002 | Chen | |
| 6,700,776 B2 | 3/2004 | Bang et al. | |
| 7,061,755 B2 | 6/2006 | Lin et al. | |
| 7,252,351 B2 | 8/2007 | Chen et al. | |
| 7,410,194 B2 | 8/2008 | Chen et al. | |
| 7,428,835 B2 | 9/2008 | Fan et al. | |
| 7,672,124 B2 | 3/2010 | Zhang et al. | |
| 8,864,183 B1* | 10/2014 | Mason | H05K 5/03 292/1 |
| 9,207,724 B2 | 12/2015 | Coster et al. | |
| 9,696,769 B1* | 7/2017 | Hamilton | G06F 1/181 |
| 2003/0001395 A1* | 1/2003 | Barthelet | E05B 15/0053 292/175 |
| 2004/0256864 A1* | 12/2004 | Erickson | E05B 65/006 292/303 |
| 2005/0068723 A1 | 3/2005 | Squillante | |
| 2005/0140254 A1 | 6/2005 | Chen et al. | |
| 2005/0231898 A1* | 10/2005 | Sura | G06F 1/181 361/679.58 |
| 2006/0209501 A1* | 9/2006 | Han | G06F 1/181 361/679.36 |
| 2010/0090568 A1* | 4/2010 | Tang | G06F 1/181 312/223.1 |
| 2010/0091454 A1 | 4/2010 | Degner et al. | |
| 2010/0232104 A1* | 9/2010 | Tang | E05B 65/006 361/679.58 |
| 2011/0127895 A1* | 6/2011 | Conn | G06F 1/181 312/294 |
| 2011/0156549 A1* | 6/2011 | Zhang | H05K 5/02 312/223.1 |
| 2011/0157779 A1* | 6/2011 | Chang | H05K 5/0221 361/679.01 |
| 2012/0262038 A1 | 10/2012 | Zeng et al. | |
| 2013/0089281 A1* | 4/2013 | Mitsui | H04M 1/0237 384/26 |
| 2014/0091693 A1* | 4/2014 | Tatsukami | H05K 5/0221 312/319.1 |
| 2014/0117826 A1 | 5/2014 | Senatori et al. | |
| 2014/0251678 A1* | 9/2014 | Chen | H05K 5/0221 174/520 |
| 2016/0259381 A1* | 9/2016 | Geng | G06F 1/182 |
| 2016/0334838 A1* | 11/2016 | Cheng | G06F 1/182 |
| 2017/0223853 A1* | 8/2017 | Samuels | H04M 1/0252 |

* cited by examiner

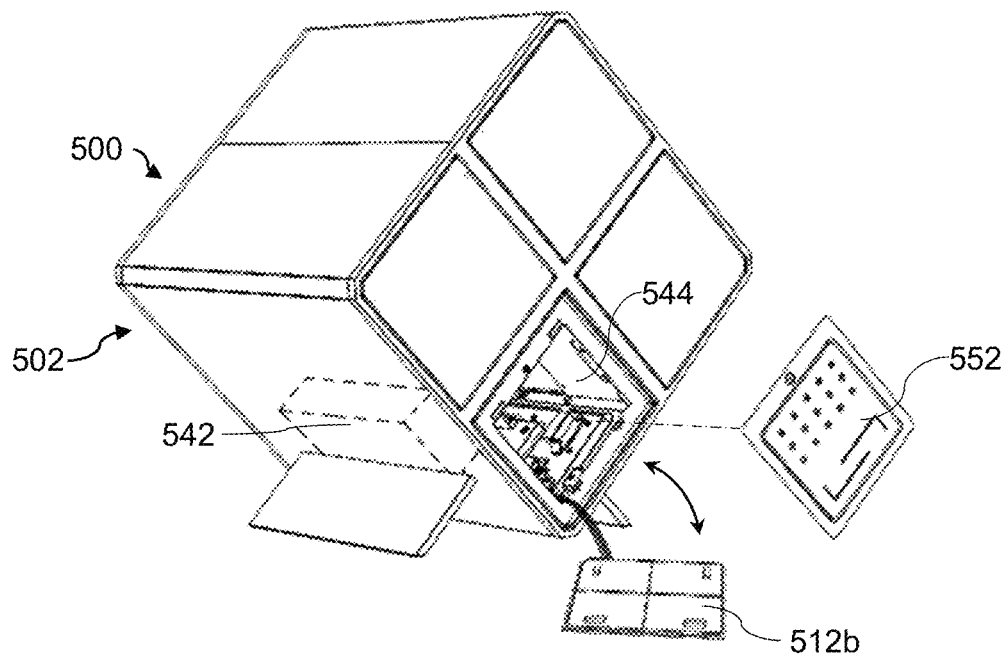
Fig. 5B
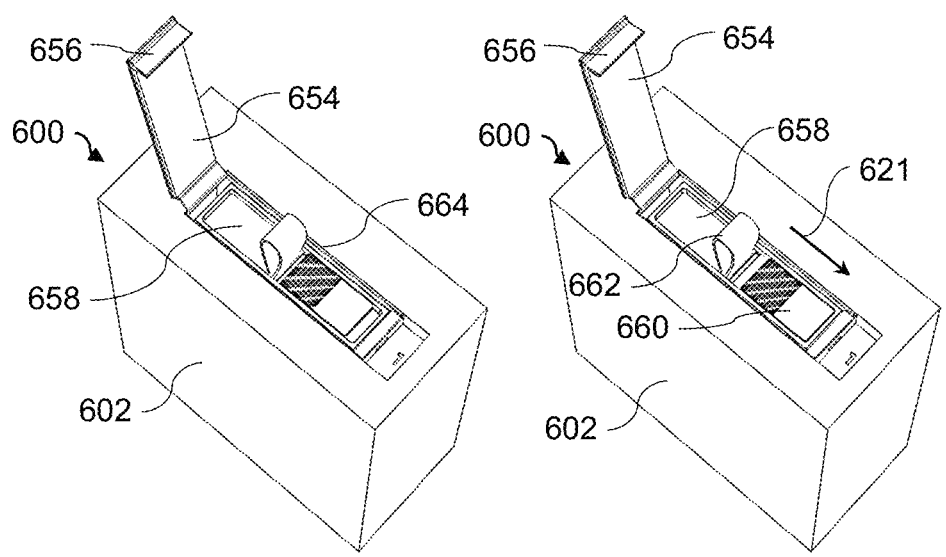
Fig. 6A                    Fig. 6B

COMPUTING DEVICES

BACKGROUND

Computing devices may include components to carry out various functions, processes or tasks. Such components may be disposed within an enclosure of the computing device. Enclosures of computing devices may include removable portions to provide access to the internal components disposed within the computing device. Enclosures of computing devices may also structurally support the components of the computing device and provide access to such components through various ways.

BRIEF DESCRIPTION OF THE DRAWINGS

FIG. 5B is a perspective view of an example device.
FIG. 6A is a perspective view of an example device.
FIG. 6B is a perspective view of an example device.

DETAILED DESCRIPTION

Figure 1A:
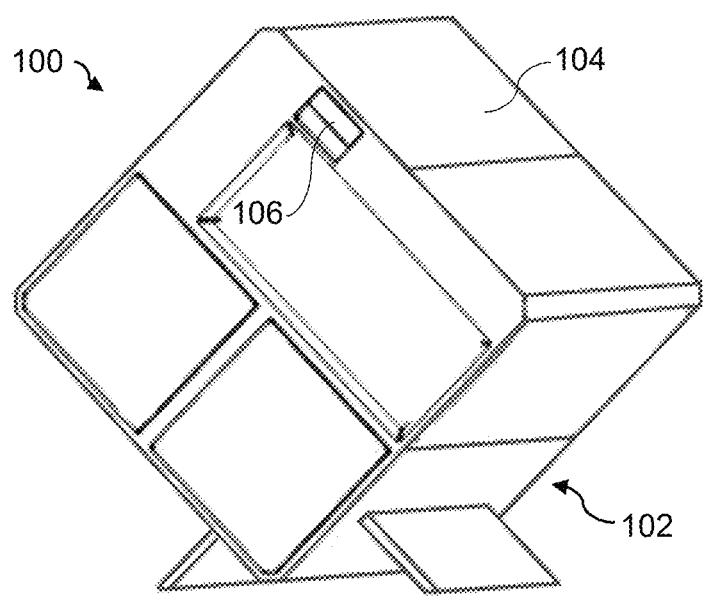
FIG. 1A is a perspective view of an example device.

Computing devices may be electronic devices for carrying out general or specific tasks. Computing devices may include components to perform or carry out such tasks. Further, such components may be disposed internally to or within an enclosure of the computing device. Components, in some situations, may be attached to, or partially or wholly structurally supported by, an enclosure of the computing device. In other situations, computing devices may include multiple enclosures that may be disposed together or apart from one another, or may be partially or wholly attached, integrated, or otherwise connected to each other.

Enclosures of computing devices may include ways to access internal components disposed within the enclosure to repair, replace, upgrade, or perform other actions on or with the internal components. In some situations, enclosures of computing devices may include a removable portion or panel for accessing the internal components of the computing device. In other situations, enclosures may include more than one removable portion for access to the internal components. The removable panel or panels may be attached to the enclosure by mechanical fasteners, pins, tabs, or other fastening devices to removably fix the removable panels to the enclosure. As such, removing the panels, in some situations, may be time or labor intensive for a user of the computing device. It may be desirable, in some situations, for the computing device to include a way to enable the fast and easy removal of a removable panel from the enclosure. In some situations, it may further be desirable to eject, release, or otherwise partially remove a removable panel from the enclosure of the computing device, wherein a user or another mechanism may then manually complete the removal of the panel. In yet further situations, it may be desirable for an enclosure of a computing device to have a mechanism to enable the fast and easy attachment of a removable panel or panels to the enclosure. It may be desirable for the enclosure to automatically secure and fasten the removable panel back to the enclosure.

Enclosures of computing devices may also include ways to prevent removable portions or panels of the enclosure from being removed if so desired. In some situations, additional fasteners, or fasteners that cannot be removed with common tools or methods may be used to secure the removable panel or panels to the enclosure and prevent unwanted removal. In other situations, mechanical locks may be employed to lock the removable panel or panels to the enclosure, sometimes engaging with a separate key in order to release the panel. These methods of locking the panel or panels to the enclosure may be time and/or labor intensive to disengage. It may be desirable for the enclosure to include a way to quickly and easily lock the removable panel to the enclosure, and also to quickly and easily unlock the panel for removal from the enclosure.

Implementations of the present disclosure provide a device, which may be a computing device, or further, a computing system, that may include an enclosure. The enclosure may include a removable panel, panels, or portion, and may further include a mechanism to enable the fast and easy removal and attachment of such removable panels or portions. Further, the enclosure may include a mechanism to eject or otherwise partially remove or detach a removable panel or portion. Additionally, implementations of the present disclosure may provide an enclosure of a computing device that may include a mechanism for the fast and easy locking and unlocking of a removable panel to the enclosure.

Referring now to FIG. 1A, a perspective view of an example device 100 is illustrated. The device 100 may be a computing device or computing system, in some implementations. In further implementations, the device 100 may include components such as processors, storage drives, memory, optical drives, power supplies, or other components typically found within or used in conjunction with computing devices. Some or all of the components of the device 100 may be internal components and may be disposed within the computing device. In some implementations, the device 100 may include an enclosure 102, wherein a component of the device 100 may be disposed within the enclosure 102. The enclosure 102 may be a rigid or semi-rigid structure that may house, cover, protect, or otherwise structurally support a component or components of the device 100. The enclosure 102, in some implementations, may have a substantially rectangular, square, or similar geometry. In this context, substantially rectangular may refer to a geometry wherein the enclosure 102 includes flat panels that may be unitary or be assembled to one another at orthogonal angles, in order to give the enclosure the appearance of a box. In some implementations, the enclosure 102 may include a diamond shaped geometry. In other implementations, the enclosure 102 may have a geometry of a different shape, or having a different number of sides or panels.

In some implementations, the enclosure 102 may include a removable panel or portion 104. The removable panel 104 may be a wall or an exterior panel of the enclosure, or a portion thereof. Further, the removable panel 104 may be removable by a user or other mechanism in order to access an internal cavity, area, or space of the enclosure, or a component of the device 100 disposed within the enclosure 102, or within such an internal space thereof. It may be desirable to access an internal space of the device 100 in order to install, repair, upgrade, remove, replace, or perform other actions on or with an internal component of the device 100.

Figure 1B:
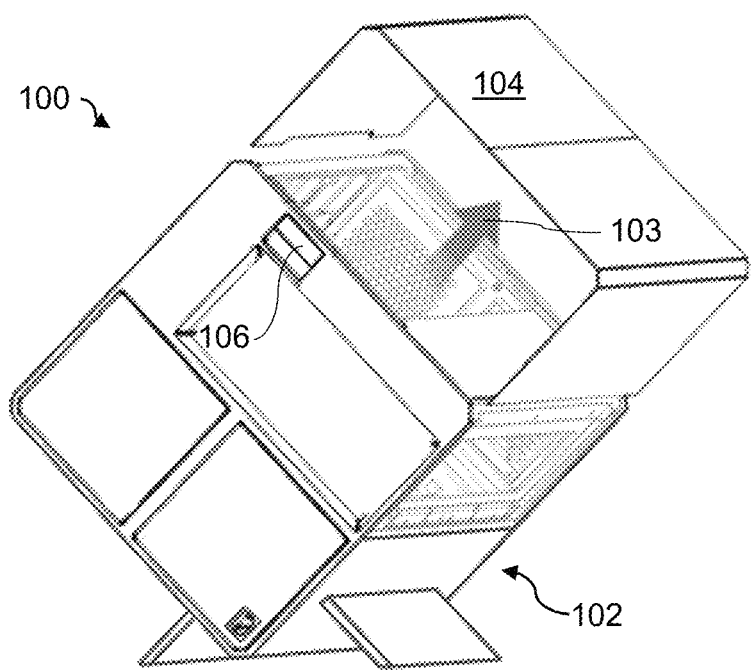
FIG. 1B is a perspective view of an example device.

Referring additionally to FIG. 1B, a perspective view of an example device 100 is illustrated, wherein a removable panel 104 has been removed from the enclosure 102 of the device 100. In some implementations, the removable panel 104 may be removable along an example direction represented by arrow 103. In other implementations, the removable panel 104 may be removable along a different direction. In further implementations, the removable panel 104 may comprise a single panel of the enclosure 102, or multiple panels of the enclosure 102. In the illustrated example of FIG. 1B, the removable panel 104 may comprise panels that may make up multiple sides of the enclosure 102. For example, the removable panel 104 may include three panels or sides, forming a substantially U-shaped structure. In other words, the removable panel 104, in some implementations, may have a central side or portion, and two adjacent sides disposed on opposite ends of the central side. Therefore, the U-shaped removable panel 104, when assembled on or attached to the device 100, may cover three in-line sides of the device 100, as illustrated in FIG. 1B, or, in other words, a central side and two adjacent sides. In some implementations, the sides of the removable panel 104 may be disposed at orthogonal angles to one another. In other implementations, the sides of the removable panel 104 may be disposed at oblique angles to one another, or a combination of orthogonal and oblique angles.

Figure 1C:
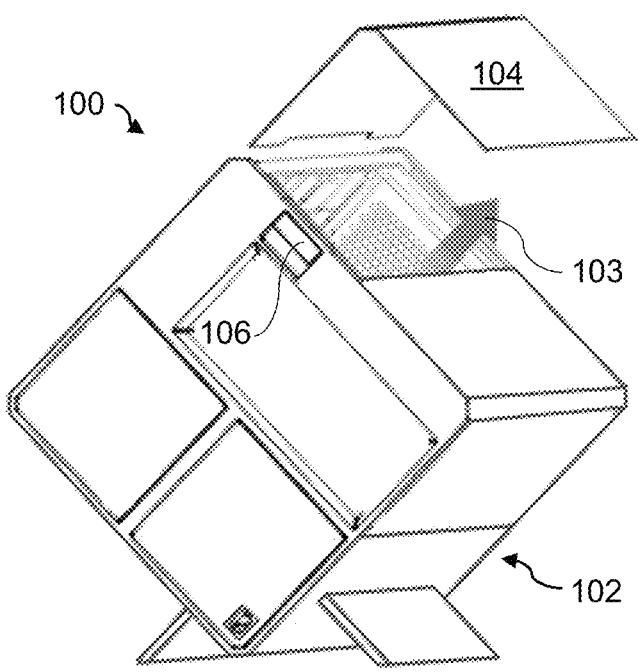
FIG. 1C is a perspective view of an example device.
Figure 1D:
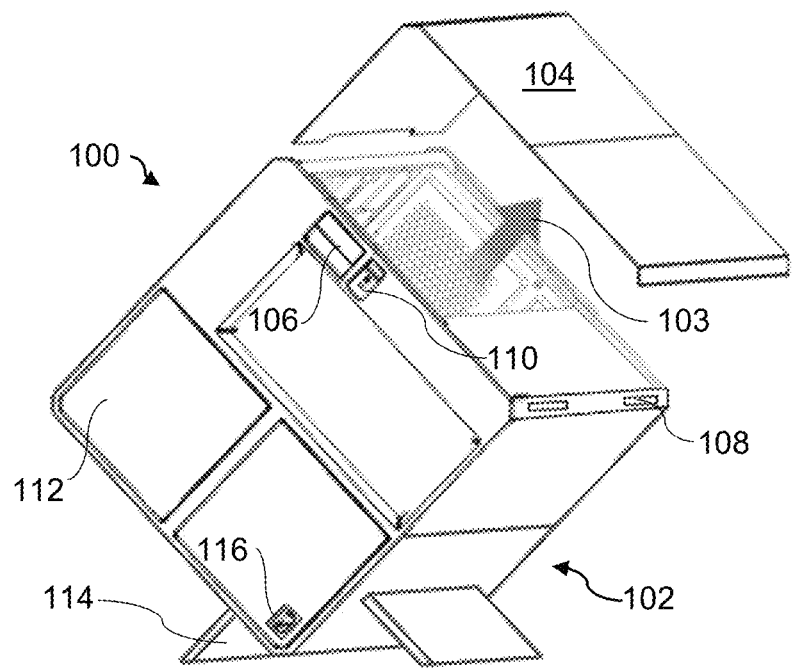
FIG. 1D is a perspective view of an example device.

Referring to FIGS. 1C-D, additional perspective views of an example device 100 is illustrated. In some implementations, the removable panel 104 may include a shape other than a U-shape. For example, the removable panel 104 may include a substantially L-shaped structure. In other words, the removable panel 104 may have two sides that are adjacent to one another, and may cover at least a portion of each of two adjacent sides of the device 100. In some implementations, one or both of the sides may extend sufficiently so as to completely cover the respective side of the device 100 when the removable panel 104 is assembled on to the enclosure 102. In other implementations, one or both of the sides of the removable panel 104 may only partially cover a side of the device 100 when assembled on to the enclosure 102.

The enclosure 102 may include a release member 106, in some implementations. The release member 106 may enable the removal of the removable panel 104 from the rest of the enclosure 102. In further implementations, the release member 106 may cause the removable panel 104 to eject from a fully attached or secured position on the enclosure 102 to a partially removed position, or ejected position. Once the removable panel 104 is disposed in the ejected position, a sufficient gap may be created between the panel 104 and the surrounding enclosure 102 such that a user may then grab the panel 104 and fully remove the panel 104 from the enclosure 102 to a fully removed position. The internal space and/or internal components of the device 100 within the enclosure 102 may be accessible once the removable panel 104 is disposed in the fully removed position, but not when the panel 104 is only in the ejected position, in some implementations. In other implementations, another mechanism may continue removing the removable panel 104 from the ejected position, to the fully removed position. In some implementations, the release member 106 may be a handle or lever. In other implementations, the release member 106 may be a push button, or another type of mechanism.

Referring again to FIG. 1D, the enclosure 102 of the example device 100 may include additional elements. For example, in some implementations, the enclosure 102 may include one or multiple engagement slots 108 to engage with the removable panel 104. The engagement slots 108 may each be an aperture or opening in the enclosure, and may each be sized sufficiently to receive a mating hook or other protrusion on the removable panel 104. The engagement between each engagement slot 108 and the respective mating protrusion of the panel 104 may keep the panel 104 securely attached to the enclosure when the removable panel is engaged with the enclosure 102. Further, upon the removable panel 104 being ejected from the enclosure 102, or otherwise being removed from the enclosure 102, each mating protrusion of the panel 104 may lift up and out of the respective engagement slot 108 in order to fully disengage the removable panel 104 from the enclosure 102.

In further implementations, the device 100, or the enclosure 102 thereof, may further include a panel lock 110. The panel lock 110 may releasably lock the removable panel 104 to the enclosure. Additionally or alternatively, the panel lock 110 may releasably lock the release member 106 and prevent the release member 106 from releasing or ejecting the removable panel 104 from the enclosure 102.

The enclosure 102 may further include additional panels 112, in some implementations. The additional panels 112 may each be similar to each other, or may each be distinct and/or different from each other. In some implementations, at least one of the additional panels 112 is removable, in order to access an interior space within the enclosure 102. In other implementations, at least one of the additional panels 112 may include a vent or other device to facilitate the transfer of heat energy from within the enclosure to outside of the enclosure 102. In some implementations, the vent may be engaged with an air or liquid cooling system of the device 100. In yet further implementations, at least one of the additional panels 112 may be ornamental and used to enhance the aesthetic appearance of the device 100.

In some implementations, the device 100, and/or the enclosure 102 thereof, may rest on one side or panel of the enclosure 102 as a base. In other implementations, the enclosure 102 may rest on an apex, joint, or abutment between two panels as a base. In such situations, the enclosure 102 may include one or multiple supports 114. Each of the supports 114 may be a rigid member that may extend from the enclosure in order to engage with a surface upon which the device 100 is resting. Each of the supports 114 may, therefore, provide additional surface area upon which the enclosure 102 can rest, thereby providing a stable base for the device 100. In some implementations, one or all of the supports 114 may be a unitary member of a panel of the enclosure 102. In other implementations, one or more of the supports may be a separate member that is assembled on to a panel of the enclosure 102.

In yet further implementations, the enclosure 102 may include one or multiple access ports 116 for components disposed, at least partially, within the enclosure 102. Even though only a single access port 116 is illustrated, multiple ports 116 can be employed throughout the enclosure 102. Each of the access ports 116 may be an aperture or opening in the outer surface of the enclosure 102, providing a throughway for portions of the components within to be accessed or to extend through. In some implementations, at least one of the access ports 116 may be to receive a power outlet or connector for a power supply of the device 100. Additional access ports 116 may include openings for storage drives, Universal Serial Bus (USB) interfaces, speaker vents, thermal vents, security access cards, display interfaces, or other components that may benefit from accessing the exterior of the enclosure 102.

Figure 2A:
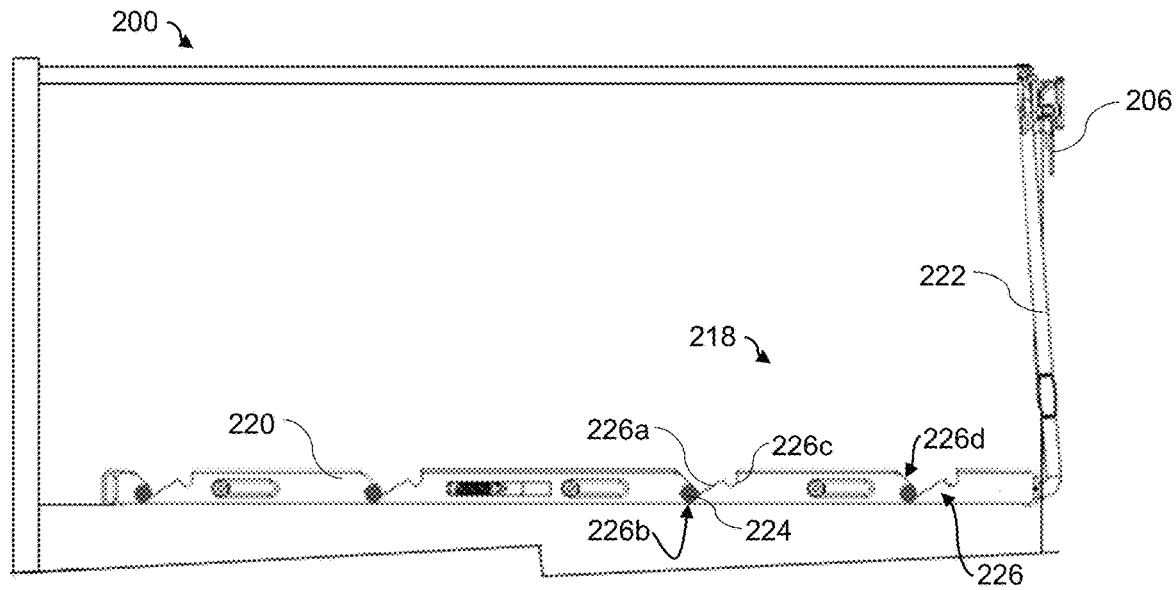
FIG. 2A is a side view of an example device.

Referring now to FIG. 2A, a side view of an example device 200 having an example panel release 218 is illustrated. Example device 200 may be similar to example device 100. Further, the similarly named elements of example device 200 may be similar in function and/or structure to the elements of example device 100, as they are described above. Note, the components illustrated in FIGS. 2A-B, and 2D may be disposed within an enclosure of the example device 200, with the enclosure omitted for clarity. The example panel release 218 may include a slider 220, an actuator 222, and a release member 206, in some implementations. The slider 220 may be a movable element disposed within the device 200, sometimes in an orientation lateral to the directions of removal and attachment of a removable panel of the device 200 or of the enclosure thereof. In some implementations, the slider 220 may be a substantially flat and straight member extending along the width of the device 200. The slider 220 may be movable between a locked position and a released position, in some implementations. In further implementations, the slider 220 may engage with the removable panel of the enclosure of the device 200. In yet further implementations, the slider 220 may retain the panel to the device 200 in the locked position, and may release or eject the panel for removal from the device 200 when the slider 220 is moved to the released position.

Referring still to FIG. 2A, the slider 220 may engage with structural elements of the removable panel in order to retain the panel to the device 200 or the enclosure thereof. In some implementations, the removable panel may have a lock barrel 224 to engage with the slider 220, or a lock slot 226 thereof. As such, the lock barrel 224 may be a protrusion extending from the removable panel in a direction towards the slider 220. The lock slot 226 may be a recess, cutout, or other aperture or opening in the slider 220, and the lock slot 226 may be sized sufficiently to receive the lock barrel 224. In some implementations, the removable panel may have more than one lock barrel 224, and each lock barrel 224 may engage with a separate lock slot 226. Each of the lock barrels 224 may engage with a respective lock slot 226 in order to retain the removable panel to the device 200 and to also release or eject the removable panel from the device 200. Each lock barrel 224 may be a unitary part of the removable panel, or may be a separate element that may be assembled on to the removable panel in a manner so as to fix each of the lock barrels 224 to the panel. Each of the lock barrels 224 may be fixed to the removable panel, such that, if the lock barrels 224 are moved along each of the respective lock slots 226, the barrels 224 may move the removable panel along the same path of travel.

Figure 2B:
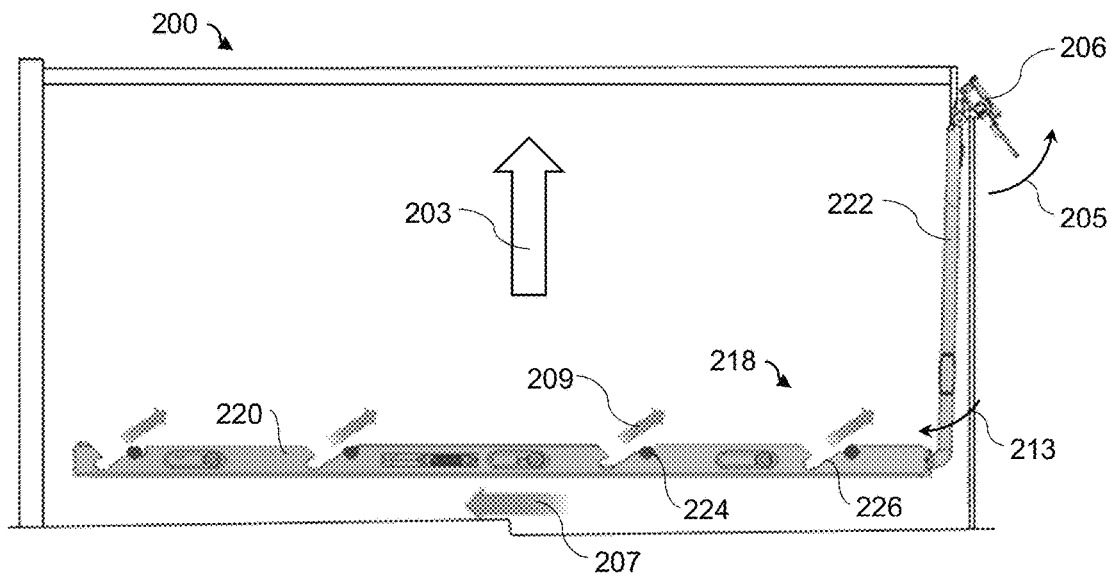
FIG. 2B is a side view of an example device.

Referring additionally to FIG. 2B, a side view of an example device 200, and the panel release 218 thereof, is illustrated, wherein the slider has been transitioned from the locked position to the released position, whereby the removable panel has been released, or ejected for removal from the device 200. Each of the lock slots 226 may receive a respective lock barrel 224 such that each lock barrel 224 is movable along an ejection ramp 226a of the lock slot 226 from a lower cradle 226b position to an upper cradle position 226c. When disposed in the lower cradle position 226b, as illustrated in FIG. 2A, each of the lock barrels 224 may be retained within the position such that the barrel, and therefore the removable panel, is prevented from moving in an upward direction, or a direction 203 towards an ejected position. Upon the slider 220 being moved along a lateral unlocking direction 207, each ejection ramp 226a may push against the respective lock barrel 224 in order to slide, transition, or otherwise move the lock barrel 224 upwards along the ejection ramp 226 along a direction similar to direction 209, until the lock barrel 224 reaches the upper cradle position, as illustrated in FIG. 2B. Throughout the transition from the lower cradle position to the upper cradle position, the fixed nature between each of the lock barrels 224 and the removable panel may cause the removable panel to move or eject in an upwards direction 203 to dispose the panel in the ejected position. In further implementations, each of the lock barrels 224 may rest when in the upper cradle position so that the removable panel may rest in the ejected position, and a user or other mechanism may grab the panel and continue to remove it from the device 200. In other words, when the slider 220 is slid or moved from the locked position to the released position, the lock slots 226 may transition each of the respective lock barrels 224 along the ejection ramp 226a to the upper cradle position 226c, wherein the barrels 224 may be held in the upper cradle position 226c by a detent in each upper cradle position 226c, thereby also keeping the slider in the released position, until the removable panel is further removed from the device 200, thereby being removed from engagement with the slider 220.

Referring still to FIG. 2B, the slider 220 may be engaged with the actuator 222 such that the actuator 222 may move or transition the slider 220 from the locked position along direction 207, in some implementations, to the released position, thereby unlocking and releasing the removable panel. The release member 206 may be engaged with the actuator 222 and may cause the actuator 222 to move the slider when the release member 206 is moved to a second position from a first position. In some implementations, the release member 206 may be a handle or lever, and may be rotated or pivoted along an example direction 205 from the first position to the second position. In other words, the first position may be a resting position for the handle 206, and the second position may be an opened position, as shown in FIG. 2B. In further implementations, the release member 206 may be moved to the second position by a user of the device 200. In yet further implementations, the release member 206 may cause the actuator to pivot or move along an example direction 213 in order to move the slider 220 from the locked position to the release position.

In some implementations, the panel release 218 may include a second slider 220 disposed on another side of the enclosure to engage with another set of lock barrels on another side of the removable panel. The release member 206 may, therefore, engage with a second actuator to move the second slider from a locked position to a released position to eject the other side of the removable panel simultaneously as the first side. The panel release 218 may include the second slider in situations where the removable panel is U-shaped, wherein the first and second sliders are each disposed on one of the two adjacent sides of the device 200.

In further implementations, the slider 220 may be engaged with a bias member to bias the slider towards the locked position. The bias member may be a resilient component that is capable of elastic deformation, or returning to its original shape after being deformed. Such a resilient component may be spring, such as a compression, tension, or torsion spring, or another resilient component. The bias member may cause the slider 220 to act in a spring-loaded fashion, so that, upon the removable panel being removed from the device 200, thereby releasing the slider 220, the bias member may urge or move the slider 220 back to the locked position.

Figure 2C:
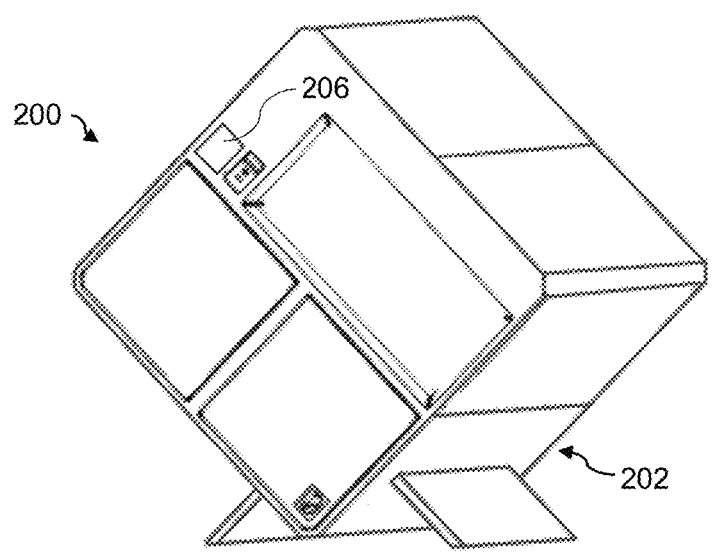
FIG. 2C is a perspective view of an example device.
Figure 2D:
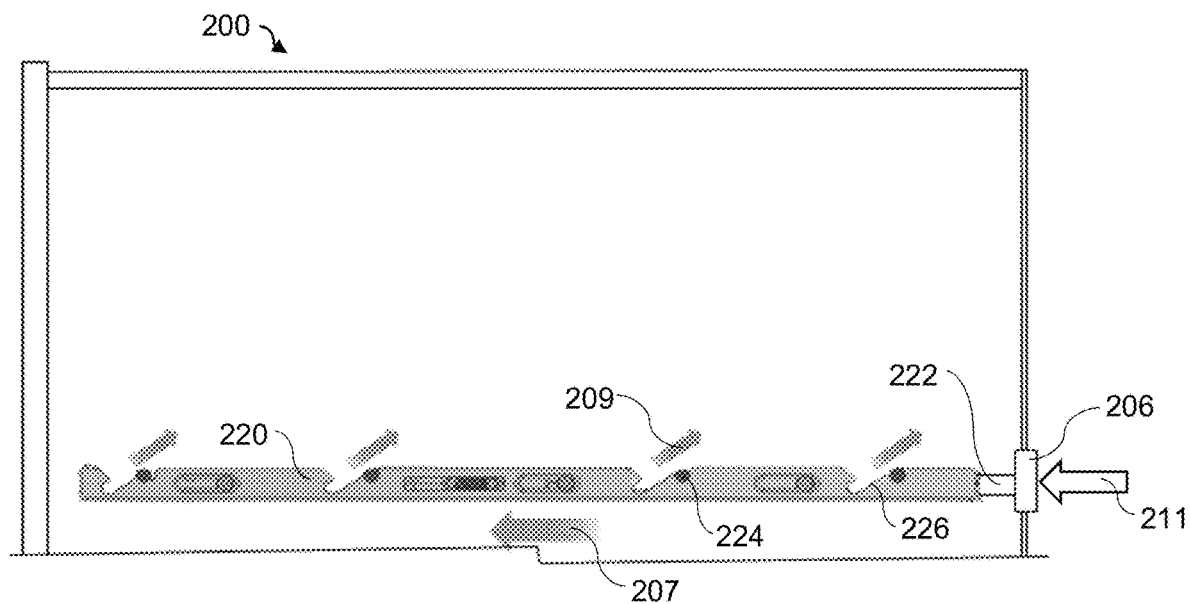
FIG. 2D is a side view of an example device.

Referring now to FIGS. 2C-D, a perspective view and a side view of an example device 200 is further illustrated. In some implementations, the release member 206 may be a push button instead of a handle, lever, or other pivoting component. In such a situation, the actuator 222 may be a linkage or other rigid or semi-rigid component that mechanically links the release member 206 to the slider 220. Additionally, the push button release member 206 may be moved from a first, resting position, to a second, depressed position, along example direction 211, as illustrated in FIG. 2D. Upon such a movement, the actuator 222 may translate the direction 211 of travel of the button 206 into direction 207 of travel of the slider 220, thereby ejecting or releasing the removable panel from the device 200, as described in more detail above.

In some implementations, each of the lock slots 226 may further include a locking ramp 226d. The lock ramp 226d may have an oppositely-oriented slope than the ejection ramp 226a. Thus, in order to reattach or reinstall the removable panel, each lock barrel 224 need only contact the respective locking ramp 226d. Once in contact, a user or another mechanism may push on the removable panel in a direction opposite to the ejection direction 203 so that each barrel pushes on the respective locking ramp 226d in order to slide or move the slider 220 back towards the released position along direction 207 until each of the lock barrels 224 can drop back into the lower cradle position 226b, and the bias member can urge the slider 220 back towards the locked position, once again locking or retaining the removable panel to the enclosure.

Figure 3A:
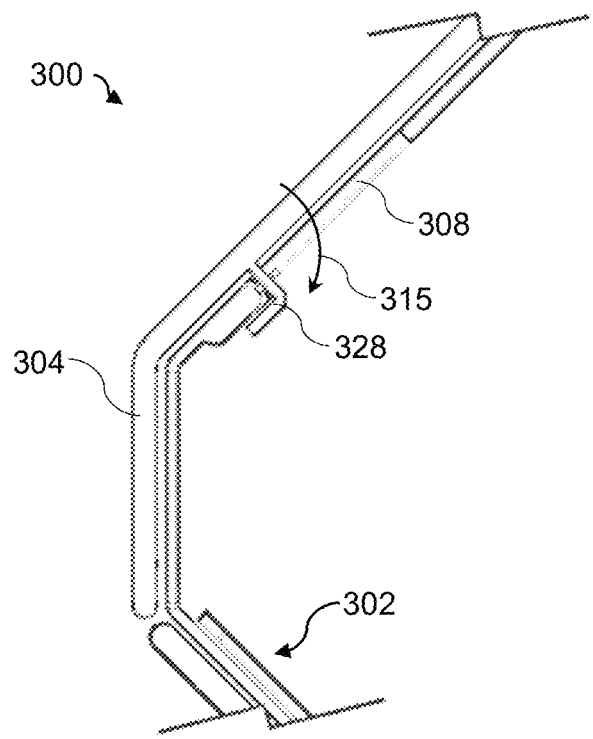
FIG. 3A is a cross-sectional side view of an example device.
Figure 3B:
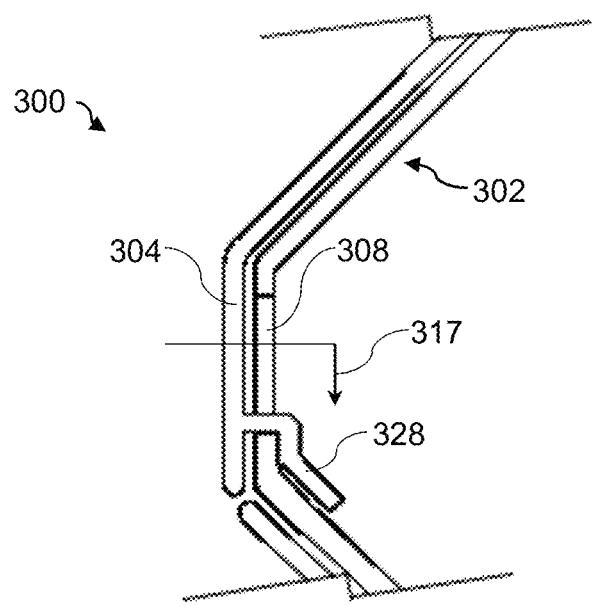
FIG. 3B is a cross-sectional side view of an example device.

Referring now to FIGS. 3A-B, side views of an example device 300 are illustrated. Example device 300 may be similar to example device 100 or 200. Further, the similarly named elements of example device 300 may be similar in function and/or structure to the elements of example device 100 or 200, as they are described above. The illustrated side views in FIGS. 3A-B may be taken along a cross-sectional view line bisecting a removable panel 304 and an enclosure 302 of the device 300 that the removable panel 304 may be installed on or attached to. In some implementations, the removable panel 304 may have an attachment hook 328 disposed on or attached to the removable panel 304. The attachment hook 328 may be a hook or another protrusion extending from the removable panel 304 towards an inside of the panel 304. Additionally, the attachment hook 328 may be a unitary part of the removable panel 304, or, in other implementations, may be a separate element that is assembled, fastened, or fixed on to the panel 304. In some implementations, the attachment hook 328 may be located closer to one edge of the removable panel 304 than an opposite edge. In further implementations, the attachment hook 328 may be located near a free edge of the removable panel 304 that may be opposite to a fixed edge of the panel that engages with a panel release of the device 300.

The attachment hook 328 may mate to or otherwise engage with an engagement slot 308 of the device 300, or the enclosure 302 thereof. In some implementations, the attachment hook 328 may have a hook or tab-like geometry and may engage with an edge of the engagement slot 308, such that when the removable panel 304 is attached to or mated with the enclosure 302 of the device 300, the attachment hook 328 securely attaches the removable panel 304 to the enclosure 302. In further implementations, the attachment hook 328 may attach to the engagement slot 308 by being pivoted in a similar fashion to example direction 315 of FIG. 3A. In other implementations, the attachment hook 328 and engagement slot 308 may be oriented in such a way that the attachment hook 328 may engage with the slot 308 by being fully inserted into the slot 308 and then slid down to seat the attachment hook 328 with the slot 308 and/or the surrounding enclosure 302, in a similar manner to example direction 317.

In some implementations, the engagement slot 308 may have a protective bumper extending around the inside periphery of the slot 308. The bumper may include a protective material that may be difficult to damage and/or may be resistant to superficial or aesthetic blemishes or marks. The bumper, in some implementations, may include a polymer material like plastic, and, in further implementations, may protect the engagement slot 308 and the surrounding exterior surfaces from damage, scratching, marring, or other blemishes due to the attachment hook 328 contacting the engagement slot edges. In some implementations, the removable panel 304 may include more than one attachment hook 328 which may engage with a respective engagement slot 308 on the device enclosure 302.

Referring now to FIGS. 4A-D, perspective detail views of an example release member 406 of a device 400, or an enclosure 402 thereof, are illustrated. Example device 400 may be similar to example devices described above. Further, the similarly named elements of example device 400 may be similar in function and/or structure to the elements of other example devices as they are described above. The release member 406 may be moveable from a first position to a second position, for example along direction 405, in order to release a removable panel 404 from the enclosure 402. In some implementations, the first position might be a position similar to that illustrated in FIG. 4A, while the second position might be similar to that illustrated in FIG. 4B. In further implementations, the device 400, or the enclosure 402 thereof, may include a panel lock 410. In some implementations, the panel lock 410 may lock the removable panel 404 to the enclosure 402 to prevent unauthorized removal of the panel 404, and, therefore, unauthorized access to an interior space of the device 400. In further implementations, the panel lock 410 may lock the release member 406 in the first position such that the release member 406 may not cause the removable panel 404 to be released from the enclosure 402.

The panel lock 410, in some implementations, may include a switch 428 to change the panel lock 410 from an unlocked state to a locked state. In some implementations, the panel lock 410 may be represented as being in the unlocked state FIG. 4A-B, and being in the locked state in FIG. 4C, after the switch 428 has been moved or slid along direction 419. In further implementations, when the panel lock 410 is in the locked state, the panel lock 410 may lock the release member 406 in the first position such that the release member 406 may not cause an actuator of the device 400 to move a slider of the device 400 from a locked position to a released position. In yet further implementations, the panel lock 410, or the switch 428 thereof, may prevent the release member 406 from moving along direction 405.

The panel lock 410 may further include a fastener opening 432 and/or an aperture 430 for a computer lock. The fastener opening 432 and the aperture 430 may each be a receptacle extending into the panel lock 410, in some implementations. The fastener opening 432 may receive a mechanical fastener such as a pin, screw, nail, bolt, or other suitable fastener. The aperture 430 may have a slot to receive a standard external computer lock, such as a cable lock, or a Kensington lock, for example. In some implementations, each of the fastener opening 432 and the aperture 430 may be obstructed when the switch 428 disposes the panel lock 410 in the unlocked state. Therefore, neither a suitable fastener, nor an external computer lock may be engaged with the respective receptacle when the panel lock 410 is in the unlocked state. The fastener opening 432 and the aperture 430 may each become unobstructed when the switch 428 changes the panel lock 410 to the locked state, for example, by being moved or slide along direction 419. Therefore, upon the panel lock 410 locking the release member 406, either a suitable fastener, or an external computer lock, or both may be engaged with the respective receptacle. When either the suitable fastener or computer lock are so engaged, they may lock the switch 428 in its current position by preventing the switch 428 from being moved opposite to direction 419, for example, thereby locking the panel lock 410 in the locked state and preventing the release member 406 from releasing the removable panel.

Figure 4A:
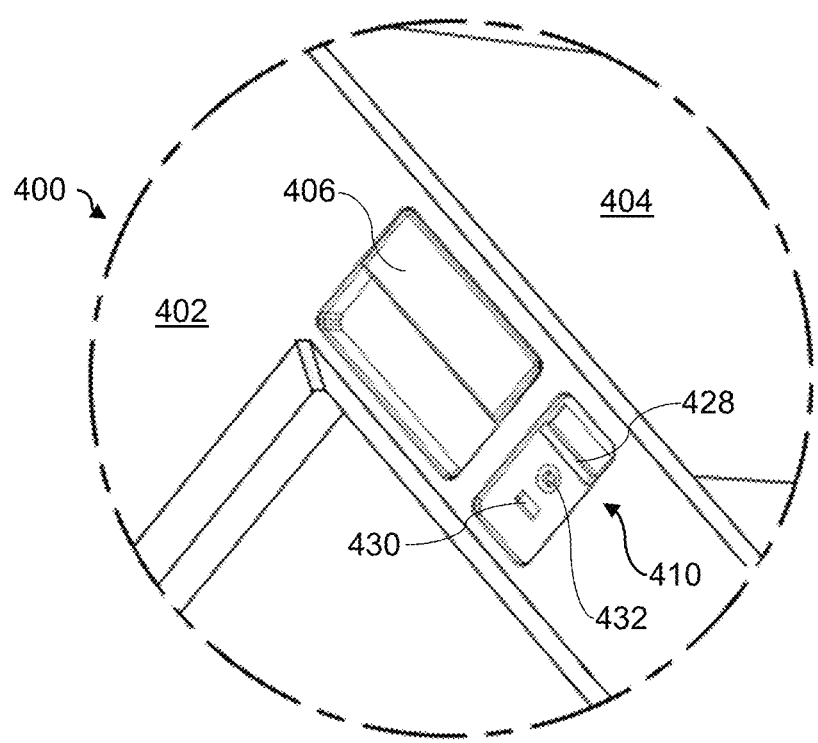
FIG. 4A is a perspective detail view of an example device.
Figure 4B:
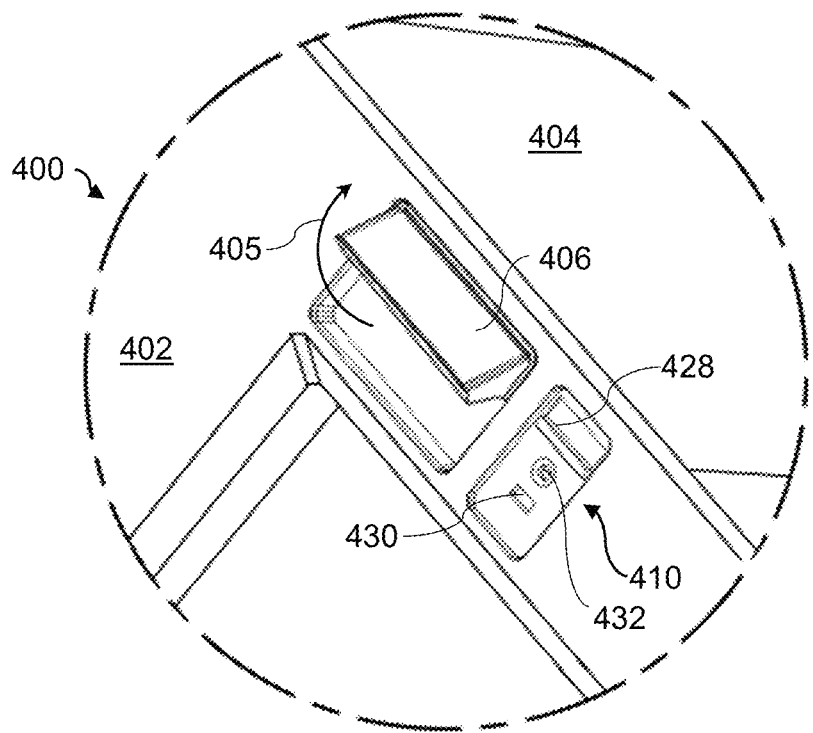
FIG. 4B is a perspective detail view of an example device.
Figure 4C:
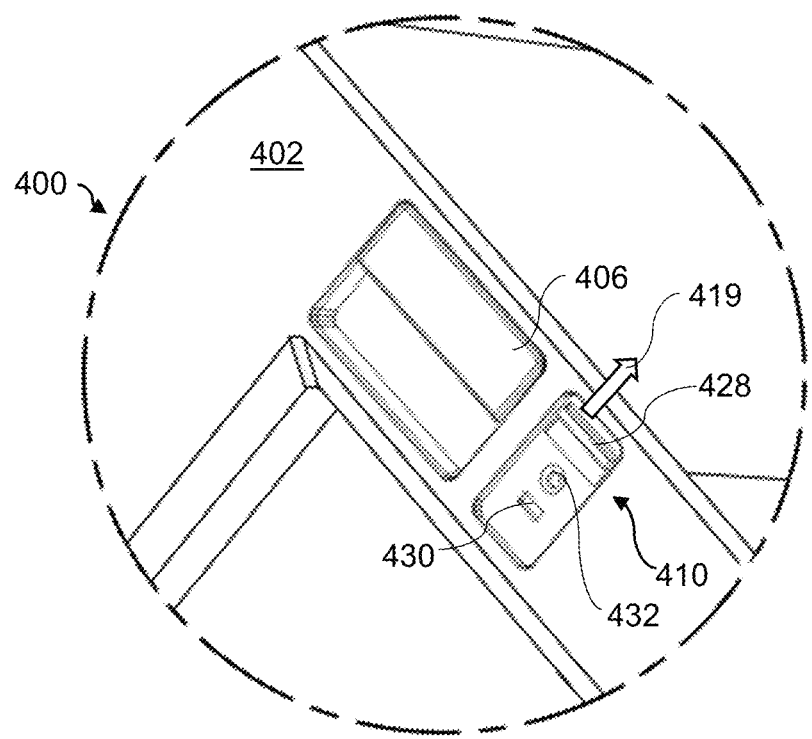
FIG. 4C is a perspective detail view of an example device.
Figure 4D:
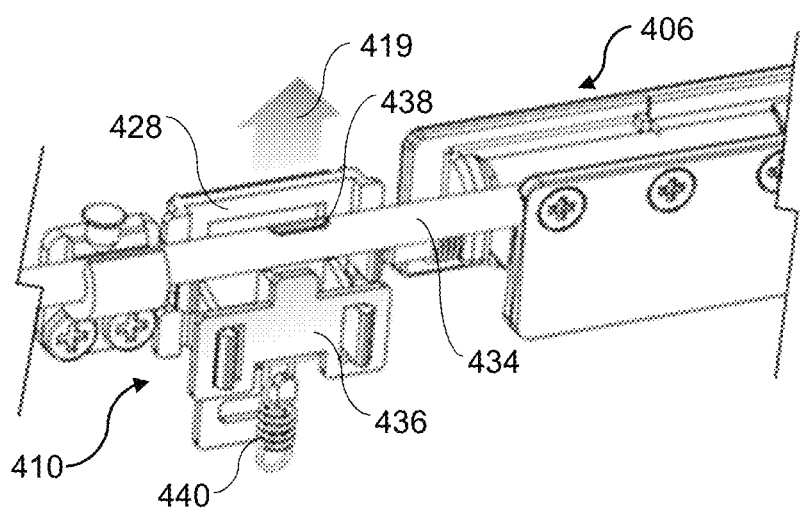
FIG. 4D is a perspective detail view of an example device.

Referring specifically to FIG. 4D, one example of a panel lock 410 is illustrated from inside the enclosure. The switch 428 may be a mechanical switch, an electrical switch, or a switch having a combination of electrical and mechanical components. In the illustrated example, the panel lock 410 may include a lock tab 436. The lock tab 436 may be a plate, tab, or other protrusion that may be rigidly fixed or linked to the switch 428, and may therefore move with the switch 428. Further, the release member 406 may be engaged with a torsion bar 434, in some implementations. The release member 406, upon being pivoted from the first position to the second position, may rotate or twist the torsion bar in order to actuate a mechanism to release or eject the removable panel from the enclosure of the device 400. Accordingly, the torsion bar 434 may include a channel 438 to receive the lock tab 436, or a portion thereof, when the switch 428 is moved to place the panel lock 410 in the locked state. In other words, upon the switch 428 transitioning the panel lock 410 to the locked state, the lock tab 436, or a portion thereof, may engage with the channel 438 of the torsion bar 434, thereby preventing any rotation or twisting of the torsion bar 434. The release member 406, without being able to rotate or twist the torsion bar, is unable to release or eject the removable panel from the enclosure. In some implementations, the panel lock 410 may also include a bias member 440, such as a spring, to bias the lock tab 436 away from engagement with the channel 438. Thus the bias member 440, through the fixed nature of the lock tab 436 and the switch 428, may spring load the panel lock 410 towards the unlocked state. In further implementations, either a suitable fastener and/or an external computer lock may be engaged with the respective receptacle 432 or 430 in order to keep the panel lock 410 in the locked state, and prevent the bias member 440 from pulling the panel lock 410 back to the unlocked state.

Figure 4E:
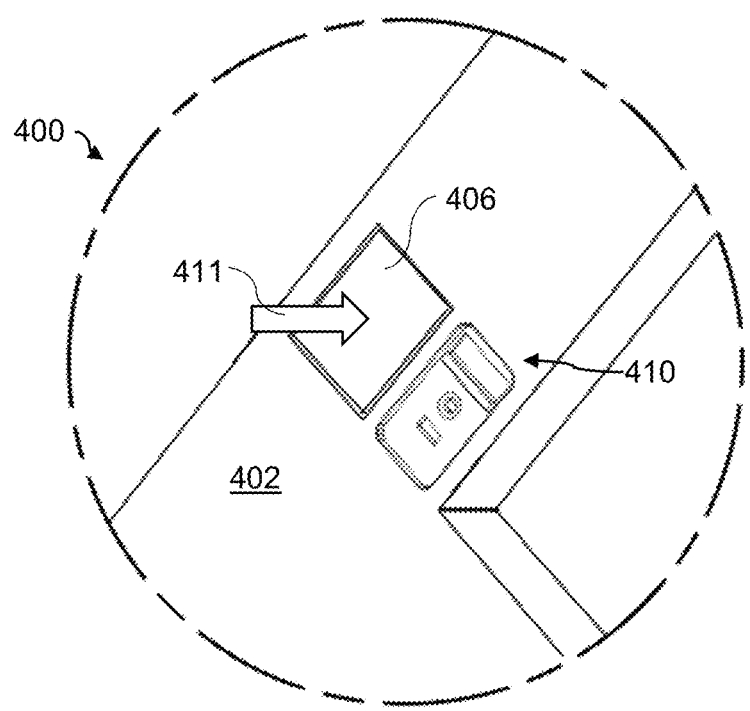
FIG. 4E is a perspective detail view of an example device.

Referring now to FIG. 4E, a perspective detail view of another example release member 406 and panel lock 410 is illustrated. In some implementations, the release member 406 may be a push button. In such implementations, the panel lock 410 may still transition between an unlocked state and a locked state. In the locked state, the panel lock 410, as similarly described above, may prevent the release member 406 from releasing a removable panel from the device 400, or an enclosure thereof. More specifically, the panel lock 410 may prevent the release member 406 from transitioning from a first position to a second position, along direction 411 for example, thereby preventing the release member 406 from releasing or ejecting the removable panel. In the illustrated example, the panel lock 410 may prevent the push button release member 406 from being pushed in to a second position, from its resting first position.

Figure 5A:
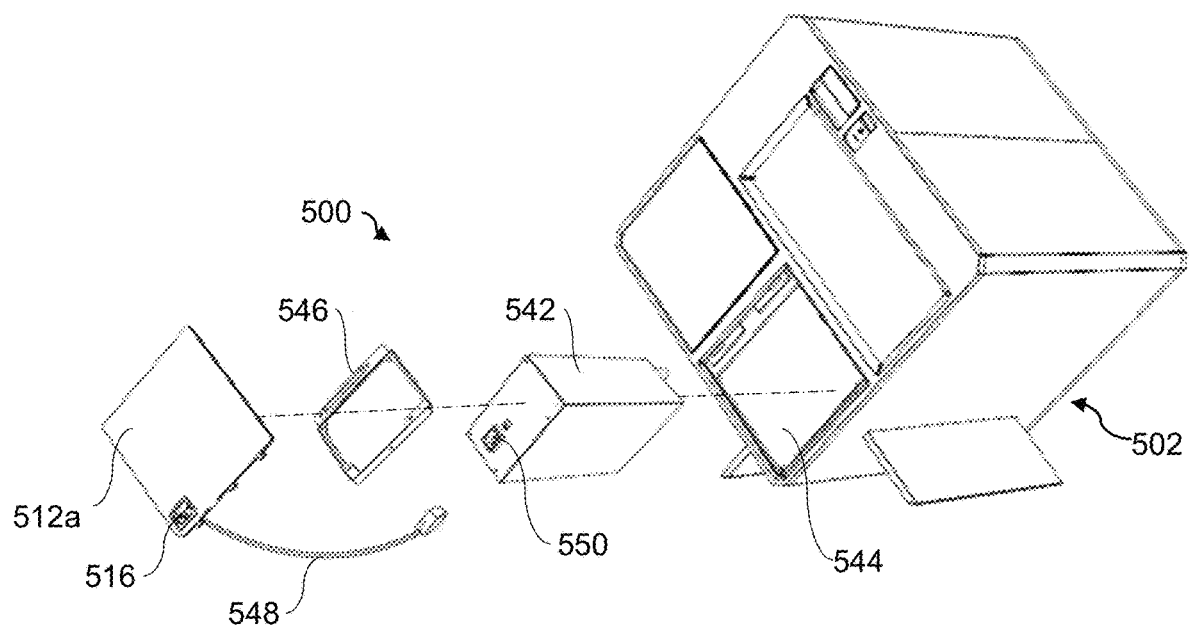
FIG. 5A is a perspective view of an example device.

Referring now to FIGS. 5A-B, perspective views of an example device 500 are illustrated. Example device 500 may be similar to other example devices described above. Further, the similarly named elements of example device 500 may be similar in function and/or structure to the elements of other example devices as they are described above. In some implementations, the example device 500 may include an enclosure 502, which may include panels 512a and 512b. The panel 512a may be removable from and reattachable to the enclosure. In some implementations, the panel 512a may be attachable through a press fit, an interference fit, a snap fit, or other fastener-less method. In other implementations, the panel 512a may be attached and removed with the use of mechanical fasteners. Additionally, removing panel 512a may provide access to a computing component 542, or provide access for installation of the component 542. In some implementations, after removing panel 512a, component 542 may be installed within the enclosure, and the panel 512a may then be reattached to the enclosure to hide the component 542. In further implementations, the component 542 may be installed within the enclosure so that a face of the component 542 does not abut the panel 512a, but is spaced apart from the panel 512a once installed. In yet further implementations, the component 542 may be fixed within the enclosure by a retaining bracket 546.

In some implementations, the component 542 may be a computing component that would benefit from having access to the exterior of the enclosure. Such a component may be a power supply, a motherboard, a storage drive or component to receive a storage drive, or another component that may benefit from having a receptacle extend through an exterior panel of the enclosure. In such a situation, panel 512a may include an exterior port, outlet, or receptacle 516. Such a receptacle 516 may be operably engaged with an extension cord, umbilical cord, or other component to operably engage the receptacle 516 with a mating or identical receptacle 550 disposed on the component 542. Thus, the component 542 may be disposed within the enclosure and not be adjacent to the panel 512a, yet still receive access to the exterior of the enclosure. In some implementations, the component 542 may be a power supply with an electrical plug 550, and the panel 512a may have another electrical plug 516 that may operably connect with the plug 550 through the use of an extension cord 548.

Referring additionally to FIG. 5B, panel 512b may be similar in structure and function to panel 512a, but disposed on an opposing side of the enclosure of the device 500. Further, panel 512b may be aligned with panel 512a through the width of the enclosure. In some implementations, computing component 542 may have cabling or wiring that may be engaged with another component of the device 500, such as a motherboard, for example. In further implementations, such cabling or wiring may extend out of component 542 on a side other than the side facing panel 512a. For example, with component 542 installed in the device 500, cabling might extend out of the component 542 on a side opposite to the side of installation. As such, panel 512b may be removable from the enclosure to expose an access area 544 in order to access such cabling or wiring, and to plug in, connect, or otherwise engage the cabling with other components of the device 500. Additionally, the device 500 may include an accessory kit 552, in some implementations. Such an accessory kit 552 may include spare parts, tools, or other accessories, and the kit 552 may be disposed within the access area 544, in further implementations. In other implementations, the accessory kit 552 may be disposed in a different area of the device 500, or the enclosure 502 thereof.

Referring now to FIGS. 6A-B, a perspective view of a device 600 is illustrated. Example device 600 may be similar to other example devices described above. Further, the similarly named elements of example device 500 may be similar in function and/or structure to the elements of other example devices as they are described above. Example device 600 may include an enclosure 602 which, in some implementations, may be representative of just a portion of above-described enclosures. As such, elements described in conjunction with enclosure 602 or device 600 may also be present in any of the above described devices or enclosures.

Enclosure 602 may include a dock or receiving bay 664 to engage with a storage drive 658. In some implementations, the dock 664 may receive another computing component instead of a storage drive. The dock 664 may include a cover 654, in some implementations, to cover the dock 664 for structural, protective, or aesthetic reasons. In further implementations, the cover 654 may be a hinged cover and include a retention tab 656 to engage with the enclosure 602 in order to retain the cover 654 in a closed position. In yet further implementations, the enclosure 602 may include a divot or other cavity adjacent to the retention tab 656 so a user or other mechanism may grab the retention tab 656 to disengage the tab from the enclosure and open the cover 654.

Storage drive 658 may be slidably engaged with the dock 664 and may be a hard disk drive (HDD), a solid-state drive (SSD), flash memory drive, an optical drive, or another type of data storage drive. In some implementations, the storage drive 658 may be disposed within a casing, housing, shell, or have a faceplate or other component that may include a latch 660. The latch 660 may be a sliding latch or may operate in a different manner, and may retain the storage drive 658 within the dock 664. In order to remove the storage drive 658 from the dock 664, the latch 660 may be disengaged, for example, by sliding the latch along direction 621, and the storage drive 658 may be slidably removed from the dock 664. In some implementations, the act of unlatching or sliding the latch 660 may instruct the device 600 that the storage drive 658 is about to be removed, and the device 600 may, therefore, prepare for such a removal in order to prevent data-loss. For example, the device 600 may stop communication with the drive 658. The storage drive 658 may also include a lanyard, tassel, tag, handle, or other element 662 which may be grabbed and pulled in order to slide the storage drive 658 out of the dock 664. In some implementations, the storage drive may be hot-swappable, or, in other words, may be removable and replaceable without shutting down the device 600. In further implementations, the device 600, or the enclosure thereof, may have multiple docks 664, each with its own storage drive 658 or other computing component. In such an example, each dock 664 may include a unique identifying marking to differentiate it from the other docks 664.

Figure 6C:
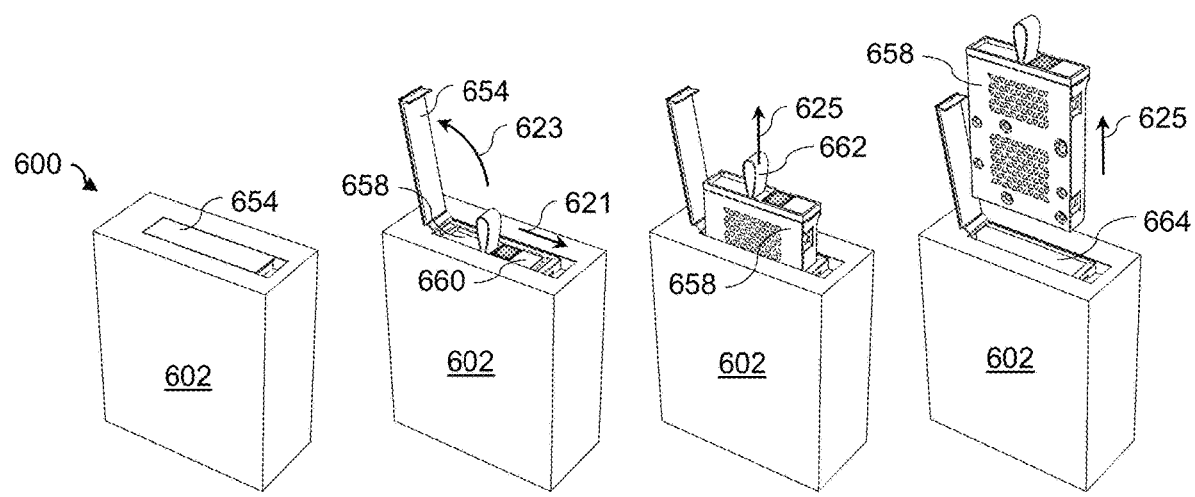
FIG. 6C is a perspective view of an example device.

Referring now to FIG. 6C, a graphical representation of removal of a storage drive 658 is represented. A cover 654 of a dock 664 may be opened, for example, along direction 623. A latch 660 of the storage drive 658 may be moved along direction 621 in order to unlock the storage drive 658, and, in some implementations, instruct the device 600 that the drive 658 is about to be removed. A user or another mechanism may pull on a lanyard 662 along a removal direction 625 in order to slidably remove the drive from the dock 664.

What is claimed is:

1. A computing device, comprising:
   a substantially U-shaped removable panel to cover at least a portion of each of a central side of the computing device and two adjacent sides to the central side;
   a first slider and a second slider to retain the removable panel to the computing device and to eject the removable panel for removal from the computing device, the first and second sliders each disposed on one of the two adjacent sides; and
   a release member to engage with an actuator to move the first and second slider to eject the removable panel,
   wherein the actuator is to transition the first and second slider from a locked position to a released position upon the release member being transitioned from a first position to a second position, and
   wherein each of the first and second slider is to transition a lock barrel of the panel along an ejection ramp of a lock slot of the respective slider from a lower cradle position to an upper cradle position to eject the removable panel to rest in an ejected position upon being disposed in the released position.

2. The computing device of claim 1, wherein the removable panel has a plurality of lock barrels and each of the first and second sliders have a plurality of lock slots, each lock slot corresponding to one of the plurality of lock barrels.

3. A computing system, comprising:
   a removable panel having a plurality of lock barrels fixed to the removable panel;
   a panel release, comprising:
      a slider to retain the removable panel to the computing device and movable between a locked position and a released position, the slider having a plurality of lock slots each with an ejection ramp, each lock slot corresponding to one of the plurality of lock barrels;
      a release member movable between a first and second position;
      an actuator; and
      a torsion bar to engage the release member with the actuator, the release member to rotate the torsion bar upon moving from the first position to the second position such that the torsion bar causes the actuator to move the slider from the locked position to the released position,
      wherein upon being moved from the locked position to the released position, each ejection ramp of the respective lock slot is to push against the respective lock barrel to move the lock barrel along the ejection ramp from a lower cradle position to an upper cradle position to eject the removable panel; and
   a panel lock comprising a switch to transition the panel lock between an unlocked state and a locked state, the panel lock to lock the release member in the first position when in the locked state,
   wherein the panel lock includes a lock tab linked to the switch so as to move with the switch, the lock tab to engage with a channel in the torsion bar to prevent rotation of the torsion bar upon the panel lock moving to the locked state.

4. The device of claim 3, wherein the slider is to stay in the released position until the removable panel is removed from engagement with the slider.

5. The device of claim 3, further comprising a bias member to bias the slider towards the locked position.

6. The computing device of claim 3, wherein the removable panel is substantially L-shaped and is to cover at least a portion of each of two adjacent sides of the computing system.

7. The computing system of claim 3, wherein the panel lock is to receive a Kensington lock when in the locked state, the Kensington lock to prevent the panel lock from being changed back to the unlocked state.

8. The computing system of claim 3, wherein the release member is a handle.

9. The computing system of claim 3, wherein the release member is a push button.

10. The device of claim 3, wherein the lock barrel is disposed in the upper cradle position in the lock slot when the slider is in the released position such that the panel rests in the ejected position.

11. The device of claim 10, wherein the barrel is held in the upper cradle position by a detent such that the panel rests in the ejected position and the slider is held in the released position.

* * * * *